United States Patent [19]

Sassi

[11] 4,270,638
[45] Jun. 2, 1981

[54] APPARATUS FOR TRANSFERRING TORQUE FROM A DRIVING SHAFT TO A DRIVEN SHAFT

[75] Inventor: Kari Sassi, Helsinki, Finland
[73] Assignee: Konejukka Oy, Finland
[21] Appl. No.: 20,414
[22] Filed: Mar. 14, 1979
[51] Int. Cl.³ .............................................. F16D 15/00
[52] U.S. Cl. .................................... 192/45.1; 192/47; 192/74
[58] Field of Search .......................... 192/45.1, 47, 74

[56] References Cited

U.S. PATENT DOCUMENTS

| 2,297,166 | 9/1942 | Robin et al. | 192/45.1 |
|---|---|---|---|
| 3,877,556 | 4/1975 | Brownscombe | 192/45.1 |
| 3,907,083 | 9/1975 | Nieder | 192/45.1 X |
| 3,923,132 | 12/1975 | Van der Klugt | 192/45.1 |
| 3,946,843 | 3/1976 | Downs | 192/45.1 |

Primary Examiner—Philip C. Kannan
Attorney, Agent, or Firm—Steinberg & Raskin

[57] ABSTRACT

Apparatus for transferring torque from a driving shaft to a driven shaft include an outer coupling body attached to the driven shaft defining an interior cylindrical cavity and which is movable both rotatably and axially between an idling and a coupling position, an inner coupling body disposed within the cavity having a lower portion concentric with respect to the cavity and an upper portion having an interior coupling surface eccentric with respect to the cavity. The driving shaft extends within the inner body and has a first coupling member engaging the interior coupling surface and a second coupling member which engages the inner coupling body when the outer coupling body is in its idling position and which is disengaged therefrom when the outer coupling body is in its coupling position. When the outer coupling body is in its idling or disengaged position, the inner coupling body rotates concentrically within the interior of the outer coupling body due to the engagement of the second coupling member with the inner coupling body. Upon the outer coupling body being moved to its coupling position, the second coupling member becomes disengaged from the inner coupling body whereupon the inner coupling body which tends to rotate about its eccentric axis through engagement between the first coupling member and the interior coupling surface, tilts and binds against the interior cavity to rotatably couple the outer coupling member to the inner coupling body.

14 Claims, 4 Drawing Figures

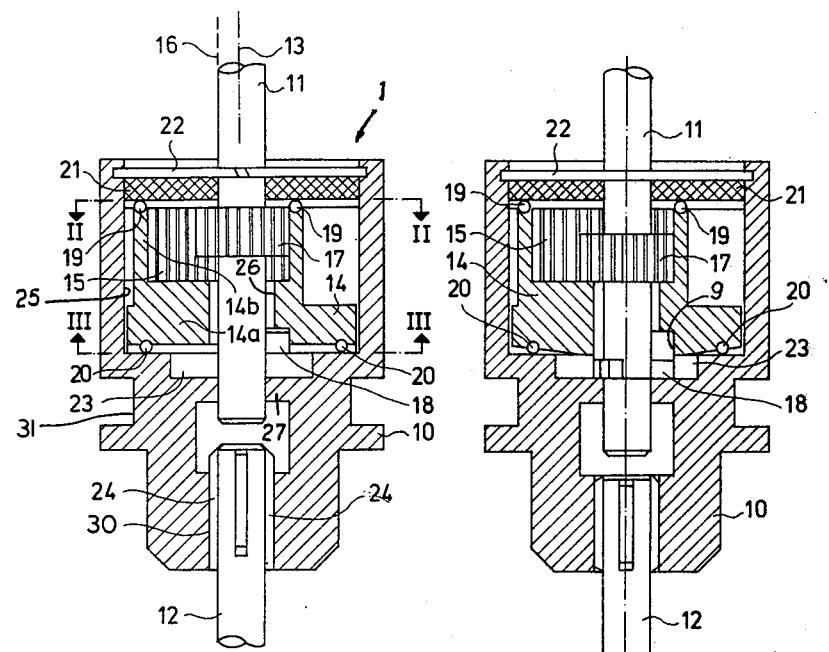
FIG. 1　　　FIG. 4
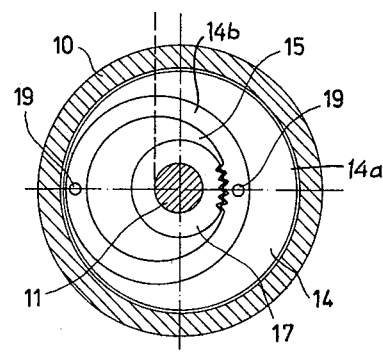　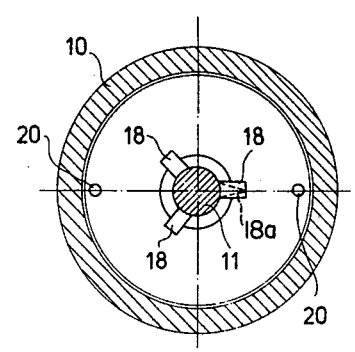
FIG. 2　　　FIG. 3

APPARATUS FOR TRANSFERRING TORQUE FROM A DRIVING SHAFT TO A DRIVEN SHAFT

BACKGROUND OF THE INVENTION

This invention relates generally to torque transmission apparatus and, more particularly, to a mechanical clutch apparatus of the stepless type.

Couplings and clutches for the transmission of torque from driving to driven shafts are well known. Such known couplings or clutches may be mechanical, hydraulic or electrically actuated. More particularly, mechanical clutches and couplings may be grouped into certain classes, such for example, as fixed couplings, moving couplings, elastic couplings, disengagement clutches and self-actuating clutches.

With respect to fixed couplings, the most common type utilizes a bolted flange coupling for interconnecting the driven to the driving shaft. With respect to moving couplings, the most common are geared couplings, spherical couplings, universal joint couplings and Cardan joints. Elastic couplings are generally similar to fixed couplings of the flange type wherein in lieu of the bolted flange connection, an elastic connection, such as a rubber sleeve, is utilized to interconnect the shafts.

The most common types of disengaging clutches include so-called dog clutches and various types of friction clutches. However, dog clutches have the known disadvantage of being engagable only while the shafts are stationary or rotating at a very low rate. Such clutches, however, can become disengaged during rotation. Friction clutches constitute the largest group of disengaging clutches and generally effect torque transfer by means of friction. However, such friction clutches are not entirely satisfactory in that slippage can occur between the driving and driven shafts during engagement of the clutch or when the driven shaft is in an overloaded condition. Such slippage results in deleterious heating of the clutch elements. The most widely known friction clutch is the disc clutch which finds use generally in automobile transmission apparatus, machine tools, etc. Another type of friction clutch is the so-called conical clutch which is used predominately in industrial applications as well as in vehicles to a somewhat lesser extent. Drum clutches having friction surfaces in the form of cylinders are also known.

With respect to self-actuating clutches, these conventionally include starting clutches, safety clutches and reversing clutches. Since the torque required in the initial start-up of machines is generally several times larger than the torque required to maintain a steady state rotation thereof, the particular start-up torque requirements depending upon the available time for start-up, it is usually not economical or otherwise practical to design the prime mover and power or torque transmission apparatus on the basis of the required start-up torque. In such cases, so-called starting clutches are utilized which are designed to allow the motion of the shafts to reach their highest desirable rotational speed.

The coupling and clutches described above, including the disengaging clutches, elastic couplings and movable couplings, are not entirely satisfactory. Thus, conventional mechanical couplings and clutches, e.g. geared couplings and/or dog clutches are disadvantageous in that they cannot operate in a stepless manner, i.e., as a stepless clutch. Conventional stepless clutches, such as so-called fluid clutches or torque converters, however, are relatively complex in design and are therefore expensive in manufacture. Such fluid clutches require the use of fluid seals which tend to wear during use requiring periodic replacement or servicing. As mentioned above, friction clutches have the drawback that slippage between the driving and driven shafts is not uncommon which causes wear thereby requiring frequent servicing.

SUMMARY OF THE INVENTION

Accordingly, one object of the present invention is to provide a new and improved apparatus for transferring torque from a driving to a driven shaft which may be classified as a disengaging clutch, an elastic coupling or as a movable coupling, depending upon its intended use, which overcomes the disadvantages inherent in conventional couplings and clutches of this type as described above.

Another object of the present invention is to provide a new and improved torque transfer apparatus which functions as a stepless clutch.

Still another object of the present invention is to provide a new and improved torque transfer apparatus which is simple in construction and economical in manufacture.

Still yet another object of the present invention is to provide a new and improved apparatus for transferring torque from a driving to a driven shaft which is reliable in operation and which does not wear to a significant extent during use.

A further object of the present invention is to provide a new and improved torque transfer apparatus which does not require complex manufacturing operations for its construction.

Yet another object of the present invention is to provide a new and improved torque transfer apparatus which may be manufactured of any one of a number of materials depending on its intended use and which has a wide range of applications.

Briefly, in accordance with the present invention, these and other objects are attained by providing apparatus including an outer coupling body to which the driven shaft is attached, the outer body being rotatably movable as well as axially movably between an idling or disengaged and a coupling or engaged position. An interior cylindrical cavity is formed in the outer body in which an inner coupling body is disposed, the latter having a portion concentric with respect to the cavity and an interior coupling surface formed in an eccentric manner with respect to the cavity. The driving shaft has an axis which is colinear with the axis of the interior cavity and extends into the inner coupling body. A first coupling member is fixed to the driving shaft which is adapted to engage the eccentric interior coupling surface of the inner body at least when the outer coupling body is in its coupling position. A second coupling member associated with the driving shaft engages the shaft and inner body for concentric rotation of the latter within the cavity only when the outer body is in the idling position. When the outer body is moved to the coupling position, the second coupling member becomes disengaged from the inner body so that the latter tends to rotate within the outer body cavity but for the eccentric construction of the inner body coupling surface. Thus, the inner body tilts about appropriately provided elements and engages the cavity defining wall thereby causing the outer body to rotate with the inner body thereby rotatably coupling the driving and driven shafts.

The clutch or coupling apparatus constructed according to the present invention constitutes a stepless clutch of the mechanical type and has the advantages of being relatively simple in construction as well as being easy to manufacture. The apparatus is reliable in service and is subject to a minimum of wear. The apparatus is further suitable for substantially all applications which require stepless clutches and may be constructed of any suitable material depending upon the intended use thereof.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 1 is a schematic section view of torque transfer apparatus according to the present invention, the apparatus being illustrated in its idling or disengaged condition;

FIG. 2 is a section view taken along line II—II of FIG. 2;

FIG. 3 is a section view taken along line III—III of FIG. 1; and

FIG. 4 is a schematic sectional view of the torque transfer apparatus illustrated in FIG. 1 in its coupling or engaged condition.

DESCRIPTION OF THE PREFERRED EMBODIMENT

Referring now to the drawings wherein like reference characters designate identical or corresponding parts throughout the several views, the driving shaft 11 and the driven shaft 12 are interconnected in a manner clearly described below by an apparatus 1 by which the torque from driving shaft 11 can be transmitted or transferred to the driven shaft 12. The center line or axis of rotation of driving shaft 11 is indicated by the dot-dash line 13. Apparatus 1 includes an outer coupling body 10 having an upper portion in which a cylindrical cavity 25 is defined, cavity 25 having a central axis which is substantially colinear with the axis of rotation 13 of driving shaft 11 which extends into the cavity 25 is more fully described below. An exterior annular groove 31 is centrally provided on outer body 10 for mounting the latter in a manner such that it will move in the axial direction at least with respect to the driving shaft 11 between an idling position wherein the shafts are not coupled for torque transmission and a coupling or engaged position wherein the shafts are so coupled. Outer body 10 is further mounted for rotation.

An inner coupling body 14 is located within cylindrical cavity 25. According to the present embodiment, inner coupling body 14 includes a lower portion 14a having a circular configuration as best seen in FIG. 2 whose diameter is only slightly less than the diameter of cavity 25 and is located in cavity 25 so that its axis is substantially coincident with the axis of cavity 25. In this manner, a very small clearance is maintained between the outer peripheral wall of lower portion 14a of inner body 14. Inner coupling body 14 and the inner wall of body portion 1 defining cavity 25 is further defined by an upper eccentric portion 14b having a curved interior coupling surface 15 which, in the present embodiment, comprises conventional gear teeth or a toothed rim. The internal coupling surface 15 forms at least a circular segment having a central axis which is offset from or eccentric with respect to the aligned axes of the cavity 25 and lower inner body portion 14a. It is preferable that the maximum clearance between the outer peripheral wall of lower inner body portion 14a and the wall of cavity 25 is less than the minimum clearance between the outer peripheral wall of upper inner body portion 14b and the wall of cavity 25, shown in the drawings.

The driving shaft 11 extends through the top of cavity 25 through the space defined by the interior coupling surface 15, a central opening 26 formed through the lower concentric portion 14a and is slideably received within an opening formed in a partition 27 provided in the lower portion of outer coupling body 10. The driving shaft 11 carries a gear 17 which comprises a first coupling member and three pins 18 comprising second coupling members radially extending in a common horizontal plane between gear 17 and the terminal end of driving shaft 11.

Three depressions 9 (only one shown in FIG. 4) corresponding in configuration to pins 18 are formed in the lower surface of inner coupling body 14 and radially extend therefrom having as their center or point of origin the central opening 26. When the outer coupling body 10 is moved to its idling position (shafts 11 and 12 being fixed with respect thereto), the coupling pins 18 are received in corresponding depressions 9 thereby fixing the driving shaft 11 to the inner coupling body 14 for rotation therewith about axis of rotation 13 of driving shaft 11. When the outer body 10 is moved upwardly as shown in FIG. 1 with respect to the shafts into the coupling or engaged position, as seen in FIG. 4, the pins 18 leave the depressions 9 and enter into an internal space 23 formed in the outer body 10.

According to the embodiment of the invention illustrated in the figures, gear 17 comprising the first coupling member fixed to drive shaft is constantly maintained in engagement with the tooth rim comprising the internal coupling surface 15 of inner body 14 whether the outer body 10 is in its idling or coupled position. It is through this engagement between gear 17 and the tooth rim of the coupling surface 15 that the coupling of inner body 14 to outer body 10 is accomplished. More particularly, to this end, the inner coupling body 14 is suitably mounted within cavity 25 so as to be tiltable therein. In the presently illustrated embodiment, the means for mounting the inner coupling body 14 in a manner so as to permit the tilting thereof includes a pair of diametrically opposed balls 19 provided on the top face of inner body 14 and an aligned pair of balls 20 provided on the lower surface thereof. Additionally, the toothing of coupling surface 15 and gear 17 are suitably selected so that engagement thereof will be maintained even upon tilting. It will be seen that the clearance between the driving shaft 11 and the internal periphery of the inner coupling body 14 must also be properly selected to facilitate such tilting.

In order to preclude axial movement of the inner coupling body 14 with respect to the outer coupling body 10, a ring 21 having a central opening through which driving shaft 11 can slidingly pass is located over the opened end of cavity 25 and a retainer ring 22 is fixed thereover. Balls 19 bear against the lower surface of ring 21.

The driven shaft 12 is attached to outer coupling body 10 by splines 24 received within corresponding grooves 30 so that relative rotation is prevented although axial movement therebetween is possible. Other attachments means may of course be utilized.

Referring to FIGS. 1-3 wherein the outer coupling body 10 is illustrated in its disengaged or idling position wherein the driving and driven shafts 11, 12 are uncoupled, the coupling pins 18 fixed to the driving shaft 11 at its lower end region are received within the depressions 9 thereby couplingly engaging the inner coupling body 14 thereto for rotation therewith. It is apparent that inner body 14 will rotate about the axis of rotation of its lower body portion 14a which is colinear with the axis of the cylindrical cavity 25 which, in turn, is colinear with axis 13 of shaft 11. Thus, in the idling position of outer body 10 as shown in FIG. 1, the outer body 10 remains uncoupled from the rotary inner body 14 due to the clearance between the peripheral wall of the lower inner body member portion 14a and the wall defining cavity 25. Balls 19, 20 are arranged along aligned diametrical centers as seen in FIGS. 2 and 3.

Upon the outer coupling body 10 being moved into the coupling or engaged position through movement of the outer body relative to shafts 11, 12 to the position illustrated in FIG. 4, depressions 9 are caused to disengage from pins 18, the latter entering into the open space 23 formed in the outer body 10. Thus, the rotatable fixation at this point of inner coupling body 14 to driving shaft 11 around the axis 13 is removed. Of course, the gear 17 fixed to driving shaft 11 is maintained in meshed engagement with the teeth formed on the toothed rim of the coupling surface 15 so that rotation of driving shaft 11 will tend to rotate the inner coupling body 14 about the axis of rotation 16 of the coupling surface 15 which, as described above, is eccentrically disposed with respect to the axis of rotation 13 of driving shaft 11 as well as the axis of cavity 25. However, rotation of inner coupling body 14 about axis 16 with respect to outer body 10 is obstructed due to the small clearance provided between the peripheral wall of lower inner body portion 14a and the wall defining the cylindrical cavity 25. Thus, a short time after the movement of outer body 10 to its coupling position, forces are impressed on the inner body 14 causing the latter to tilt about the balls as described above. In other words, at this time, an axial section of inner body 14 has an elliptical shape. As a consequence of the tilting movement of inner body 14, the peripheral wall of lower inner body portion 14a firmly engages the wall defining the cavity 25 thereby establishing a coupling between inner coupling body 14 and outer coupling body 10. In this manner, the outer coupling body will be caused to rotate along with driving shaft 11 and since the driven shaft 12 is secured to the outer coupling body 10, the torque of the driving shaft is transferred to the driven shaft 12.

It is apparent that an essential feature of the invention is that the inner coupling body which is located in the cavity defined within outer coupling body 10 is provided with a coupling surface or other means whereby the axis of rotation of the inner body can be shifted from a location colinear with the axis of the cylindrical cavity to a location eccentric therefrom upon the outer body 10 being moved from its idling or disengaged position to the coupling or engaged position. This is obtained according to the present invention by providing an internal coupling surface 15 whose center line is offset from the axis of rotation 13 of the driving shaft which itself is colinear with the axis of the cavity.

In the embodiment of the invention illustrated in the figures, the inner body member comprises a lower portion and an upper eccentric portion. However, it will be understood that this particular construction is not essential. For example, the inner body may be formed as a symmetrical body, i.e., have a disc or cylindrical shape having an eccentrically disposed internal toothed surface formed thereon.

It should also be noted that the internal coupling surface 15 of inner coupling body 14 in the present embodiment comprises a toothed rim. This toothed rim, however, need not extend in a full circle. Thus, it is possible to provide only about ¼ of the circumference of the internal circular surface with toothing, the only limitation being that the surface have a sufficient portion thereof provided with teeth to enable a coupling engagement with the gear 17 which comprises in the present embodiment the first coupling member fixed to the driving shaft. Of course, the same principles apply equally to the first coupling member.

Other modifications and variations of the illustrated embodiment are possible within the scope of the present invention. Thus, toothed racks, friction wheels, or other known equivalent machine elements may be utilized in lieu of the gear 17 in toothed inner coupling surface 15 depicted in FIGS. 1-4. The particular clearances described and illustrated may be suitably varied depending on the particular intended application of the apparatus. The coupling pins 18 comprising the second coupling member fixed to the driving shaft may include a single or several tapered coupling pins, such as is shown at 18a in phantom in FIG. 3. Other known elements may be utilized as the second coupling members in lieu of pins. In certain applications, it may be desirable to provide that the gear 17 and toothed internal coupling surface 15 are not engaged when the outer coupling body 10 is in its idling or disengaged position. In such cases, it then becomes necessary to employ a suitable synchronizing apparatus known per se, when it is desired to couple gear 17 and toothed surface 15 in order to effect torque transmission.

Further, the connection of the driven shaft 12 to the outer coupling body 10 may be varied from that described and illustrated herein. The axial orientation of the driven shaft 12 may deviate from that of the driving shaft 11, i.e., they need not be colinear as illustrated.

It is also possible to arrange the apparatus such that the outer coupling body 10 is fixed in the axial direction in which case the driving shaft 11 is mounted for axial movement.

As mentioned above, the apparatus can be constructed of any one of a member of suitable materials depending upon the use intended for the apparatus and the magnitude of the torque to be transferred. Thus, the outer and inner coupling bodies 10, 14, the coupling surface 15 and the coupling members 17, 18 may be constructed of metal, such as brass, iron, or steel, plastic material, or the like.

Obviously, numerous modifications and variations of the present invention are possible in the light of the above teachings. It is therefore to be understood that within the scope of the appended claims the invention may be practiced otherwise than is specifically described herein.

What is claimed is:

1. Apparatus for transferring torque from a driving shaft to a driven shaft comprising: an outer coupling body defining an interior cylindrical cavity having a first axis colinear with the axis of the driving shaft, said outer coupling body being mounted for relative movement between idling and coupling positions with respect to the driving and driven shafts; an inner coupling body located within said cavity having an upper surface, a lower surface and an interior curved coupling surface having a second axis which is offset from said first axis and a cylindrical outer surface concentrically located within said cavity having a third axis which is colinear with said first axis, the diameter of said cylindrical outer surface being slightly less than the diameter of said cylindrical cavity, said driven shaft being attached to said outer coupling body; a first coupling member fixed to the driving shaft adapted to be in coupling engagement with said interior curved coupling surface at least when said outer coupling body is in said coupling position; a second coupling member affixed to said driving shaft; means provided on said inner coupling body for couplingly engaging said second coupling member to said inner coupling body when said outer coupling body is in said idling position so that said inner coupling body is rotatable therewith around said third axis and for disengaging said inner body member from said second coupling member when said outer coupling body is in said coupling position so that said inner body has a tendency to rotate about said second axis; whereby when said outer coupling body is in the idling position, said second coupling member is engaged with said engaging means and said inner coupling body rotates within said cavity around said third axis and when said outer coupling body is in the coupling position, said second coupling member is disengaged from said engaging means and said inner coupling body tends to rotate within said cavity about said second offset axis through engagement between said first coupling member and said interior curved coupling surface of said inner coupling body, whereupon said outer coupling body is rotated by said inner coupling body thereby transmitting torque to said driven shaft.

2. Apparatus as defined in claim 1 wherein said inner coupling body is provided with tilting means for tiltably mounting said inner coupling body within said cavity of said outer coupling body so that upon said inner coupling body tending to rotate about said second offset axis, the inner coupling body tilts.

3. Apparatus as recited in claim 2 wherein said tilting means includes ball members provided on said upper and lower surfaces of said inner coupling body.

4. Apparatus as recited in claim 1 wherein said inner coupling body includes an upper portion which is eccentric with respect to said first axis.

5. Apparatus as recited in claim 4 wherein said inner coupling body further includes a lower portion which is concentric with said cylindrical cavity of said outer coupling body.

6. Apparatus as recited in claim 5 wherein clearance between the outer surface of said inner coupling body lower portion and said cylindrical cavity is less than the clearance between the outer surface of said inner coupling body upper portion and said cylindrical cavity.

7. Apparatus as recited in claim 1 wherein said outer coupling body is formed having an open space receivable of said second coupling member when the outer coupling body is in the coupling position.

8. Apparatus as recited in claim 1 wherein said interior curved coupling surface comprises a surface having teeth.

9. Apparatus as recited in claim 8 wherein said interior coupling surface comprises an internal gear rim.

10. Apparatus as recited in claim 1 wherein said first coupling member comprises a toothed member.

11. Apparatus as recited in claim 10 wherein said first coupling member comprises a gear wheel.

12. Apparatus as recited in claim 1 wherein said second coupling member comprises a radially extending coupling pin.

13. Apparatus as recited in claim 12 wherein said coupling pin is tapered.

14. Apparatus as recited in claim 12 wherein said engaging means provided on said inner coupling body comprises a groove formed therein receivable of said pin when said outer body member is in the idling position.

* * * * *